Feb. 21, 1967  A. F. McALPIN ETAL  3,305,057
FREE-WHEEL CLUTCHES
Filed June 24, 1965  3 Sheets-Sheet 1
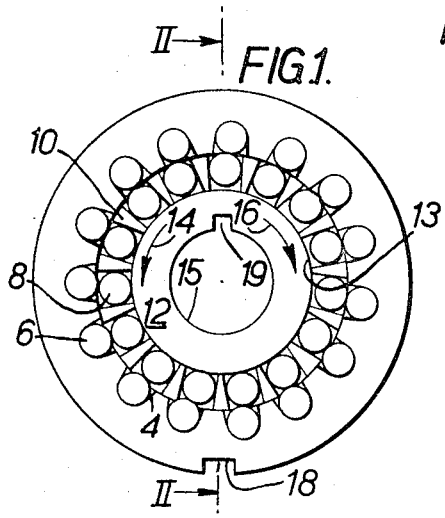
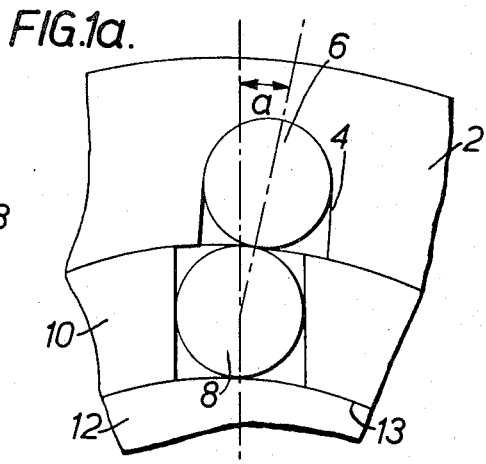
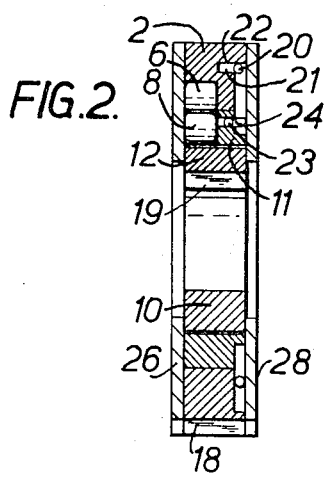
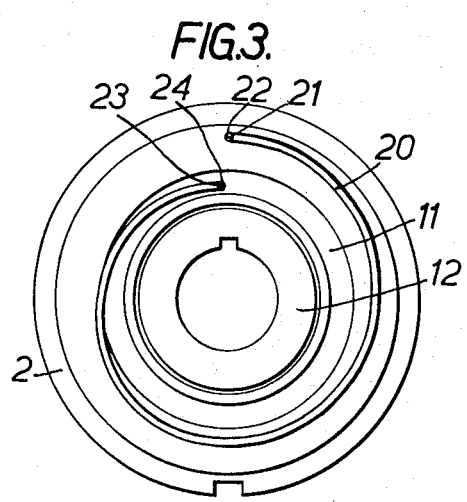
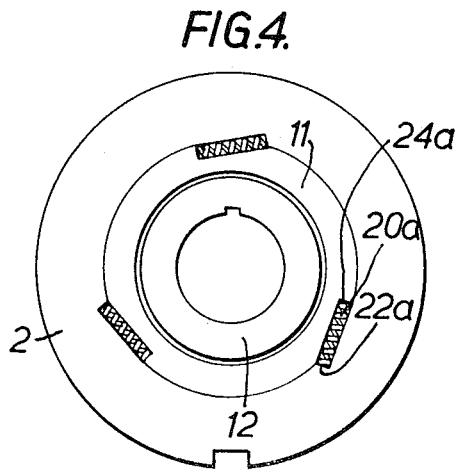
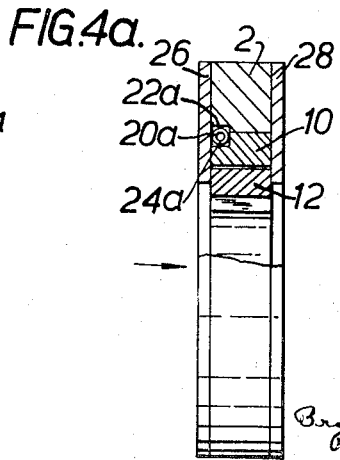
INVENTOR:
ALEXANDER F. McALPIN
DAVID A. RAYNER
WILLIAM BRANTON
BY
ATTORNEYS Feb. 21, 1967    A. F. McALPIN ET AL    3,305,057
FREE-WHEEL CLUTCHES
Filed June 24, 1965    3 Sheets-Sheet 2

INVENTOR:
ALEXANDER F. McALPIN
DAVID A. RAYNER
WILLIAM BRANTON
BY
ATTORNEYS

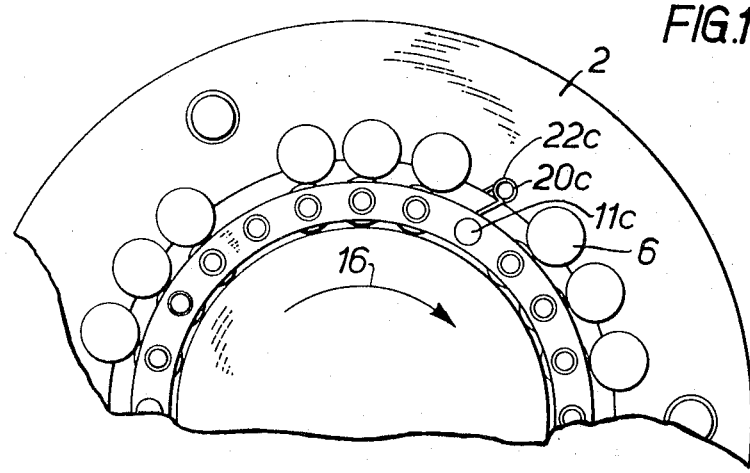
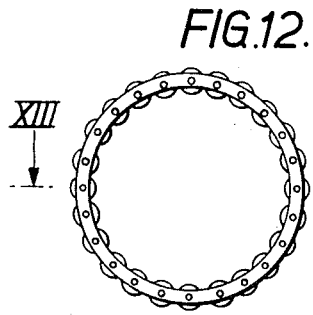
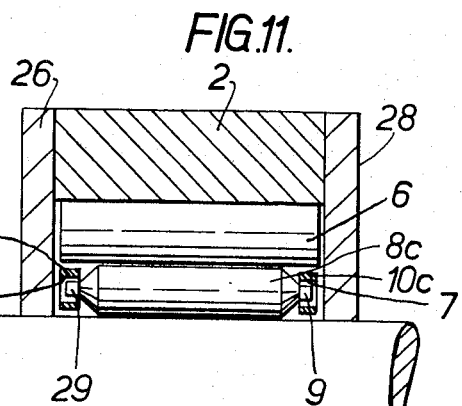
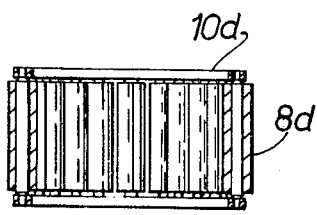

3,305,057
FREE-WHEEL CLUTCHES
Alexander Ferguson McAlpin, Beverley, and David Antony Rayner and William Branton, Hull, England, assignors to J. H. Fenner & Co. Limited, Hull, England, a British company
Filed June 24, 1965, Ser. No. 466,673
Claims priority, application Great Britain, June 27, 1964, 26,691/64
11 Claims. (Cl. 192—45)

This invention concerns free-wheel clutches.

It is conventional in free-wheel clutches to employ cylindrical rollers and wedging surfaces, but apart from requiring a high order of precision in manufacture, this arrangement involves a number of disadvantages, for example, unreliable action in service due to the fact that the rollers continually act on the same parts of the wedging surfaces.

According to the present invention, a free-wheel clutch comprises coaxial inner and outer members and two concentric sets of rollers arranged between the inner and outer members, the radial clearance between said inner and outer members being less than the sum of the roller diameters and spring means whereby a rotary bias is applied to at least one of the sets of rollers to thereby urge the rollers thereof each against a co-operating roller of the other set.

The invention will be described further, by way of example, with reference to the accompanying drawings, in which:

FIG. 1 is an axial elevation of one side of a free-wheel clutch embodying the invention, with the outer side plate removed;

FIG. 1a is a detail of FIG. 1, shown in an enlarged scale;

FIG. 2 is an axial section of the clutch taken on the line II—II of FIG. 1;

FIG. 3 is an elevation similar to FIG. 1 of the opposite side of the clutch, again with the outer side plate removed;

FIG. 4 is an elevation similar to that of FIG. 3 of a modified embodiment of clutch;

FIG. 4a is a part-axial section of the clutch of FIG. 4;

FIG. 10 is an axial elevation similar to that of FIG. 9 of yet another modification of the invention;

FIG. 11 is an elevation, partly in axial section of the clutch shown in FIG. 10;

FIG. 12 is a side elevation of a cage and roller element assembly; and

FIG. 13 is a section taken on the line XIII—XIII of FIG. 12.

Figure 5:
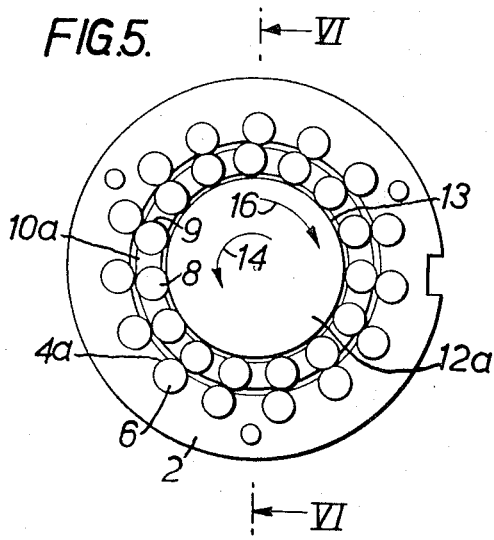
FIG. 5 is an elevation similar to that of FIG. 1 of another modified embodiment of the invention.

Referring firstly to the clutch illustrated in FIGS. 1 to 3 of the drawings, an outer clutch member 2 is formed in its internal periphery with pockets 4 for receiving an outer row of cylindrical rollers 6. Concentrically within the outer clutch member 2 is arranged an inner clutch member 12 in the form of a hub or sleeve which is provided with a hardened and ground outer cylindrical surface 13, with an axial bore 15 and a keyway 19. Between the hub 12 and the outer clutch member 2 is arranged a slotted cage 10 serving to circumferentially space a second set of cylindrical rollers 8 arranged radially inwardly of the outer row of rollers 6. The radial clearance between the outer surface 13 of the hub 12 and the radially innermost regions of the rollers 6 is less than the diameter of the rollers 8, that is to say the radial clearance available to the two rows of rollers is less than the sum of their diameters. This is clearly shown in the enlarged detail of FIG. 1a, which illustrated one of the inner rollers 8 located between the outer row of rollers 6 and the hardened surface 13 of the hub 12.

As shown in FIGS. 2 and 3, the outer clutch member 2 is formed with an axially directed hole 22 within which is located an axial lug 21 at the outer end of a spiral spring 20, the inner end of which has an axial lug 23 fitting in a hole 24 formed in a peripheral flange 11 of the cage 10. Side plates 26 and 28 are secured to the outer member 2 by screws (not shown), thus enabling the whole clutch assembly to be handled and fitted as a unit between a machine housing and a shaft. The outer member 2 of the clutch has a keyway 18 in its external periphery to enable it to be rotationally fixed in the machine housing, while the hub 12 is similarly rotationally fixed to the machine shaft by its keyway 19.

In the operation of the clutch described with reference to FIGS. 1 to 3, the spring 20 is arranged to cause the slotted cage 10 to press each of the inner row of rollers against a corresponding one of the outer row of rollers 6 and against the hardened surface 13 of the clutch hub member 12. The radial clearance between the surface 13 and the radially innermost regions of the rollers 6 is so dimensioned as to cause the centres of each co-operating pair of rollers 6 and 8 to lie on a line inclined at an angle α to the radius through the roller 8, as more readily seen in FIG. 1a. The angle α preferably lies in the range 4°–20°. Thus, with the outer clutch member 2 rotationally fixed, if the hub 12 is turned in the direction of arrow 16 in FIG. 1, the rollers 8 become wedged between rollers 6 and the hub surface 13, thereby preventing further rotation of the hub member 12 relative to member 2. If, however, the hub member 12 is rotated in the direction of the arrow 14 relative to the outer member 2, then the rollers 8 move out of their wedging engagement with the rollers 6 and surface 13, permitting the hub member 12 to rotate freely in the direction of the arrow 14. The spring 20, in addition to normally urging the rollers 8 against the rollers 6, acts in the free-wheeling direction of the clutch to prevent the slotted cage 10 from moving too far in the direction of the arrow 14, since otherwise the rollers 8 would jam between their next adjacent rollers 6 and the surface 13.

It is found that during operation of the clutch, when the hub member 12 rotates freely in the direction of the arrow 14, both sets of rollers 6 and 8 also slowly rotate, ensuring that during subsequent opposite rotation of the hub member 12 in the direction of arrow 16, a new region of each of the rollers 6 and 8 is brought into the aforesaid wedging engagement. The invention thus overcomes the previously mentioned disadvantages of prior art clutches by continually presenting new contacting surfaces for the rollers. Yet again, slight errors in the circumferential spacing of the pockets 4 in the outer clutch member 2 or in the slots of the cage 10 which initially cause some roller pairs to engage before others, thus subjecting such roller pairs to higher loads than the remaining rollers, may be compensated by making the outer clutch member 2 from a material having a yield strength slightly higher than the design load. Thus, after one or two locking operations of the clutch, any inequalities in circumferential spacing are cancelled out by plastic yielding of the pockets 4 containing the rollers 6 subjected to the higher than average loading.

It will be appreciated that the rollers 6 and 8 may have either the same or different diameters, and commercially available hardened roller bear rollers may be used. Additionally the inner member 12 may be fixed, in which case the outer member will be free to rotate in the direction of arrow 16.

A modified clutch having an alternative spring arrangement to the spiral spring 20 is shown in FIG. 4, wherein three helical springs 20a are housed in recesses 22a in outer clutch member 2 and recesses 24a in the flange 11 of slotted cage 10.

Figure 6:
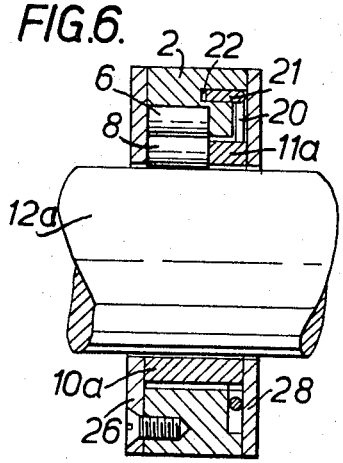
FIG. 6 is an axial section taken on the line VI—VI of FIG. 5.
Figure 7:
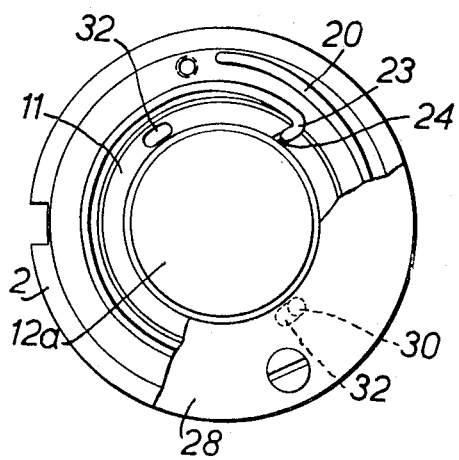
FIG. 7 is an axial elevation of the clutch of FIGS. 5 and 6, taken from the side opposite to that of FIG. 5 and with parts broken away for clarity.

FIGS. 5, 6 and 7 show another modified form of the clutch suitable for mounting directly on a hardened and ground machine shaft 12a, as a complete unit. The outer clutch member 2 is formed with circularly spaced pockets 4a containing the outer rollers 6. The slotted cage 10a is similarly formed with slots 9 containing the inner rollers 8. The machine shaft 12a is formed with the hardened and ground cylindrical surface 13. Otherwise the several parts of the clutch shown in FIGS. 5 to 7 are of similar construction and function similarly to like numbered parts in FIGS. 1, 2 and 3. To facilitate assembly of the clutch and to ensure that it can be handled as a unit when not fitted to a machine shaft, side plate 28 is fitted with axially inwardly projecting pins 30 co-operating with slots 32 in flange 11. The relationship between pins 30 and slots 32 is arranged to ensure radial location of the slotted cage 10 relative to the outer member 2 and yet allow rotational freedom for the correct functioning of the clutch.

Figure 8:
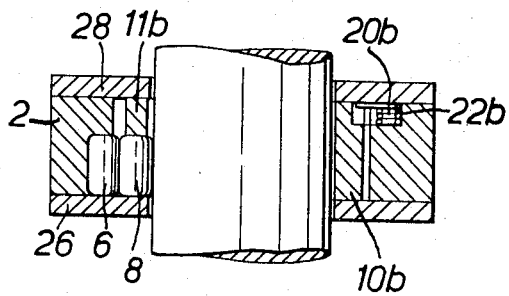
FIG. 8 is an axial section through a still further embodiment of the invention.
Figure 9:
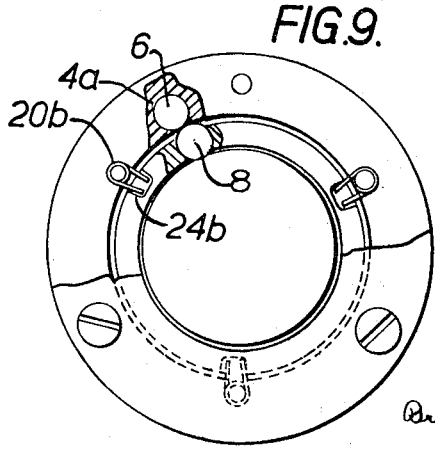
FIG. 9 is an axial elevation of one side of the clutch shown in FIG. 8, with parts broken away from clarity.

FIGS. 8 and 9 illustrate another clutch construction which is suitable for mounting on a machine shaft as a complete unit. In this case radial location of the slotted cage 10b and its solid end 11b is provided by the three torsion springs 20b located in recesses 22b in the outer member 2 and acting on the recesses 24b in the solid end 11b of slotted cage 10b. When the clutch is fitted with these torsion springs 20b the direction of rotation can be reversed without dismantling the unit. This is done by removing the inner member 12 and rotating the slotted cage 10b until rollers 8 pass to the opposite side of rollers 6, sufficient clearance for rollers 8 in the slotted cage 10b being present to allow this. Inner member 12 is then able to be re-assembled and the clutch is locked by the other legs of the springs 20b acting on the opposite sides of the recesses 24b.

Apart from the possibility of using commercially available roller bearing rollers in the construction of the clutch proposed by the invention it is possible to use commercially available cage and roller assemblies. FIGS. 10 and 11 illustrate the use of one such cage and bearing assembly for making a clutch assembly suitable for mounting as a unit on a machine shaft. In this embodiment inner rollers 8c are formed with axially concentric projections 29 of smaller diameter which enter in holes 7 of the cage rings 10c. The cage rings 10c are axially spaced apart in fixed relationship to one another by rivets 11c. A series of springs 20c mounted in recesses 22c in the outer member 2 act on the rivets 11c urging the cage rings 10c and rollers 8c in the direction of arrow 16.

An alternative cage and roller element assembly is shown in FIGS. 12 and 13, wherein hollow rollers 8d are illustrated as mounted on rivets 11d which connect and space the cage rings 10d. An increased number of rollers is thus capable of being employed, due to the more compact nature of the roller mountings, with consequent improvement in the load distribution and hence the potential life of the clutch.

We claim:
1. A free-wheel clutch comprising in combination an outer member, an inner member formed with a hardened and ground outer cylindrical surface and arranged coaxially within the outer member, two concentric sets of rollers arranged in circumfentially staggered relation between said inner and outer members, the radial clearance between said inner and outer members being less than the sum of the roller diameters, a slotted cage between said inner and outer members for circumferentially locating the rollers of one roller set to establish and maintain said staggered relation, and spring means acting between the cage and one of the clutch members for applying a rotary bias to the cage thereby to urge the caged set of rollers each against a co-operating roller of the other set.

2. A free-wheel clutch as set forth in claim 1, wherein the cage is arranged circumferentially to locate the rollers of the inner set of rollers and the spring means acts between the cage and the outer clutch member.

3. A free-wheel clutch as set forth in claim 1 wherein the rollers in one set are of greater diameter than the rollers in the other set.

4. A free-wheel clutch as set forth in claim 1 wherein the rollers in both sets are of the same diameter.

5. A free-wheel clutch comprising in combination an outer member, an inner member formed with a hardened and ground outer cylindrical surface and arranged coaxially within the outer member, two concentric sets of rollers arranged in circumferentially staggered relation between said inner and outer members, the radial clearance between said inner and outer members being less than the sum of the roller diameters, a slotted cage between said inner and outer members for circumferentially locating the rollers of the inner set to establish and maintain said staggered relation, and a spiral spring acting between the cage and the outer clutch member for applying a rotary bias to the cage thereby to urge the inner set of rollers each against a co-operating roller of the outer set, said spiral spring being formed with an axially directed lug at each end, a peripheral flange on the cage engaging the lug at the inner end and the outer clutch member being formed with a radially offset axially directed hole for receiving the lug at the outer end of the spring.

6. A free-wheel clutch comprising in combination an outer member, an inner member formed with a hardened and ground outer cylindrical surface and arranged coaxially within the outer member, two concentric sets of rollers arranged in circumferentially staggered relation between said inner and outer members, the radial clearance between said inner and outer members being less than the sum of the roller diameters, a slotted cage between said inner and outer members for circumferentially locating the rollers of the inner set to establish and maintain said staggered relation, a peripheral flange on the cage having portions thereof removed to form three equally spaced apart recesses, three corresponding recesses being formed in the outer clutch member and three helical springs one located in each pair of corresponding recesses for applying a rotary bias to the cage thereby to urge the inner set of rollers each against a co-operating roller of the outer set.

7. A free-wheel clutch comprising in combination an outer member, an inner member formed with a hardened and ground outer cylindrical surface and arranged coaxially within the outer member, two concentric sets of rollers arranged in circumferentially staggered relation between said inner and outer members, the radial clearance between said inner and outer members being less than the sum of the roller diameters, a slotted cage between said inner and outer members for circumferentially locating the rollers of the inner set to establish and maintain said staggered relation, a peripheral flange on the cage having portions thereof removed to form three equally spaced apart recesses, three corresponding recesses being formed in the outer clutch member and three torsion springs one located in each pair of corresponding recesses for applying a rotary bias to the cage thereby to urge the inner set of rollers each against a co-operating roller of the outer set.

8. A free-wheel clutch comprising in combination an outer member, two circular sides plates secured one on each side of the outer member, an inner member formed with a hardened and ground outer cylindrical surface and arranged between the two side plates coaxially within the outer member, two concentric sets of rollers arranged in circumferentially staggered relation between said inner and outer members, the radial clearance between said inner and outer members being less than the sum of the roller diameters, a slotted cage between said inner and outer members for circumferentially locating the rollers of the inner set to establish and maintain said staggered relation, a peripheral flange on the cage having portions thereof removed to form slots, axially directed pins on one of the side plates for engaging the slots to radially locate the cage relative to the outer clutch member, said peripheral flange having further portions thereof removed to form three equally spaced apart recesses and the outer clutch member likewise having portions removed to form three corresponding recesses, and three helical springs which are located one in each pair of corresponding recesses for applying a rotary bias to the cage thereby to urge the inner set of rollers each against a co-operating roller of the outer set.

9. A free-wheel clutch comprising, in combination, an outer member, an inner member mounted coaxially and concentrically within the outer member and two concentric sets of rollers arranged between the inner and outer members, the radial clearance between said inner and outer members being less than the sum of the roller diameters, said outer member having portions thereof removed from its internal periphery to form recesses for receiving the outer of the two concentric sets of rollers, a cage arranged between said inner and outer members, said cage including a pair of circular flanges axially spaced apart by rivets, each of the flanges being formed with a plurality of holes circularly spaced therearound, axial projections on each end of the rollers of the inner of the two concentric sets of rollers for fitting in the holes in the circular flanges, and spring means acting between the outer member and the cage for applying a rotary bias to the cage.

10. A free-wheel clutch comprising in combination an outer member, an inner member coaxially and concentrically within the outer member and two concentric sets of rollers arranged between the inner and outer members, the radial clearance between said inner and outer members being less than the sum of the roller diameters, said outer member having portions thereof removed from its internal periphery to form recesses for receiving the outer of the two concentric sets of rollers, a cage arranged between said inner and outer members comprising a pair of circular flanges axially spaced apart by rivets, each of the flanges being formed with a plurality of holes circularly spaced therearound, axial projections on either side of the rollers of the inner of the two concentric sets of rollers for fitting in the holes in the circular flanges, said outer member having further portions thereof removed to form further recesses, and springs disposed at least in part in said recesses are arranged to act on the rivets for applying a rotary bias to the cage thereby to urge the inner set of rollers each against a co-operating roller of the outer set.

11. A free-wheel clutch comprising, in combination, an outer member, an inner member mounted coaxially and concentrically within the outer member and two concentric sets of rollers arranged between the inner and outer members, the radial clearance between said inner and outer members being less than the sum of the roller diameters, said outer member being formed in its internal periphery with recesses for receiving the outer of the two concentric sets of rollers, a cage arranged between said inner and outer members and comprising a pair of circular flanges axially spaced apart by a plurality of rivets, the rollers of the inner of the two concentric sets of rollers each being formed with an axial through bore whereby each may be rotatably mounted between the two flanges on one of the rivets extending therebetween, and spring means acting between the outer member and the cage for applying a rotary bias to the cage.

References Cited by the Examiner

UNITED STATES PATENTS 1,735,125 11/1929 Miller _____ 192—45 X
3,108,670 10/1963 Habicht _____ 192—45 X DAVID J. WILLIAMOWSKY, *Primary Examiner.*

A. T. McKEON, *Assistant Examiner.*